United States Patent [19]
Martin et al.

[11] Patent Number: 5,369,769
[45] Date of Patent: Nov. 29, 1994

[54] METHOD AND CIRCUITRY FOR SELECTING A FREE INTERRUPT REQUEST LEVEL FROM A MULTIPLICITY OF INTERRUPT REQUEST LEVELS IN A PERSONAL COMPUTER SYSTEM

[75] Inventors: Phil Martin, Banks; Alan Packer, Portland, both of Oreg.

[73] Assignee: Intel Corporation, Santa Clara, Calif.

[21] Appl. No.: 942,516

[22] Filed: Sep. 9, 1992

[51] Int. Cl.$^5$ .............................................. G06F 13/24
[52] U.S. Cl. .................................. 395/725; 364/241.2; 364/241.5; 364/230; 364/230.2; 364/280.8; 364/DIG. 1; 364/231
[58] Field of Search ................ 395/725, 325, 800, 200

[56] References Cited

U.S. PATENT DOCUMENTS

| | | | |
|---|---|---|---|
| 4,086,627 | 4/1978 | Bennett et al. | 364/200 |
| 4,200,916 | 4/1980 | Seipp | 364/900 |
| 4,654,820 | 3/1987 | Brahm et al. | 364/900 |
| 4,901,275 | 2/1990 | Hardie et al. | 364/900 |
| 5,077,662 | 12/1991 | Hutson | 395/725 |
| 5,125,093 | 6/1992 | McFarland | 395/725 |
| 5,129,061 | 7/1992 | Wang et al. | 395/200 |
| 5,133,056 | 7/1992 | Miyamori | 395/275 |
| 5,161,102 | 11/1992 | Griffin et al. | 395/800 |
| 5,187,781 | 2/1993 | Heath | 395/325 |
| 5,261,107 | 11/1993 | Klim et al. | 395/725 |
| 5,283,904 | 2/1994 | Carson et al. | 395/725 |
| 5,291,606 | 3/1994 | Okayama et al. | 395/725 |

Primary Examiner—Gopal C. Ray
Attorney, Agent, or Firm—Blakely, Sokoloff Taylor & Zafman

[57] ABSTRACT

A method of selecting a free interrupt request level (IRQ) from a multiplicity of IRQs for assignment to a device being added to a computer system. Selection begins by identifying a first set of probably free IRQs from the multiplicity of IRQs. Afterward, actually free IRQs are identified from the first set of probably free IRQs. Finally, an IRQ that is least likely to be requested is selected from among the actually free IRQs circuitry for selecting a free IRQ is also described.

Circuitry for selecting a free IRQ within a computer system having a multiplicity of IRQs is also described. The circuitry includes circuitry for identifying a first set of probably free IRQs from the multiplicity of IRQs, circuitry for identifying a second set of actually free IRQs from the first set of probably free IRQs, and circuitry for selecting as the free IRQ a first IRQ a one of the actually free IRQs that is least likely to be requested.

14 Claims, 10 Drawing Sheets

NA = Not Available
A = Available

|  | XT | AT- | |
|---|---|---|---|
|  |  | 8 Bit Slot | 16 Bit Slot |
| IRQ0 | Timer | Timer | Timer |
| IRQ1 | Keyboard | Keyboard | Keyboard |
| IRQ2 | A | Cascaded Interrupt | Cascaded Interrupt |
| IRQ3 | Communications Port 2 | Communications Port 2 | Communications Port 2 |
| IRQ4 | Communications Port 1 | Communications Port 1 | Communications Port 1 |
| IRQ5 | Disk Drive | Printer 2 | Printer 2 |
| IRQ6 | Printer 2 | A | A |
| IRQ7 | Printer 1 | Printer 1 | Printer 1 |
| IRQ8 | NA | NA | Real Time Clock |
| IRQ9 | NA | A | A |
| IRQ10 | NA | NA | A |
| IRQ11 | NA | NA | A |
| IRQ12 | NA | NA | A |
| IRQ13 | NA | NA | A |
| IRQ14 | NA | NA | A |
| IRQ15 | NA | NA | A |

Figure 2

METHOD AND CIRCUITRY FOR SELECTING A FREE INTERRUPT REQUEST LEVEL FROM A MULTIPLICITY OF INTERRUPT REQUEST LEVELS IN A PERSONAL COMPUTER SYSTEM

FIELD OF THE INVENTION

The present invention pertains to the field of personal computers. More particularly, the present invention pertains to a method of selecting a free IRQ when adding an I/O device to a computer system.

BACKGROUND OF THE INVENTION

In prior computer systems, a user is forced to a identify free interrupt request level (IRQ) before adding a new I/O device to the computer system. If the user is not aware of the IRQ used by each device in the computer system then identifying a free IRQ becomes time consuming. The user must try IRQs at random until a free IRQ is found.

One prior solution to the problem of identifying free IRQs includes a special application specific integrated circuit (ASIC) and a resistor for each IRQ line. In addition to the cost associated with the ASIC, this solution suffers from another disadvantage. This solution depends upon specific behavior by other I/O devices in the computer system. When I/O devices do not behave in the expected manner, the prior hardware solution cannot be depended upon to accurately identify free IRQs.

SUMMARY OF THE INVENTION

The present invention includes a method of selecting a free interrupt request level (IRQ) from a multiplicity of IRQs in a personal computer for assignment to a device being added to the computer system. Selection begins by identifying a first set of probably free IRQs from the multiplicity of IRQs. Afterward, actually free IRQs are identified from the first set of probably free IRQs. Finally, an IRQ that is least likely to be requested is selected from among the actually free IRQs.

The present invention also includes circuitry for selecting for assignment to a device being added to a computer system, a free IRQ from a multiplicity of IRQs. The circuitry includes circuitry for identifying a first set probably free IRQs from the multiplicity of IRQs, circuitry for identifying a second set of actually free IRQs from the first set of probably free IRQs, and circuitry for selecting as the free IRQ one of the actually free IRQs that is least likely to be assigned.

Other objects, features, and advantages of the present invention will be apparent from the accompanying drawings and the detailed description that follows.

BRIEF DESCRIPTION OF THE FIGURES

The present invention is illustrated by way of example and not limitation in the figures of the accompanying drawings in which references indicate similar elements and in which:

FIG. 2 is a table of IRQs and the I/O devices assigned to those IRQs.

DETAILED DESCRIPTION

Figure 1:
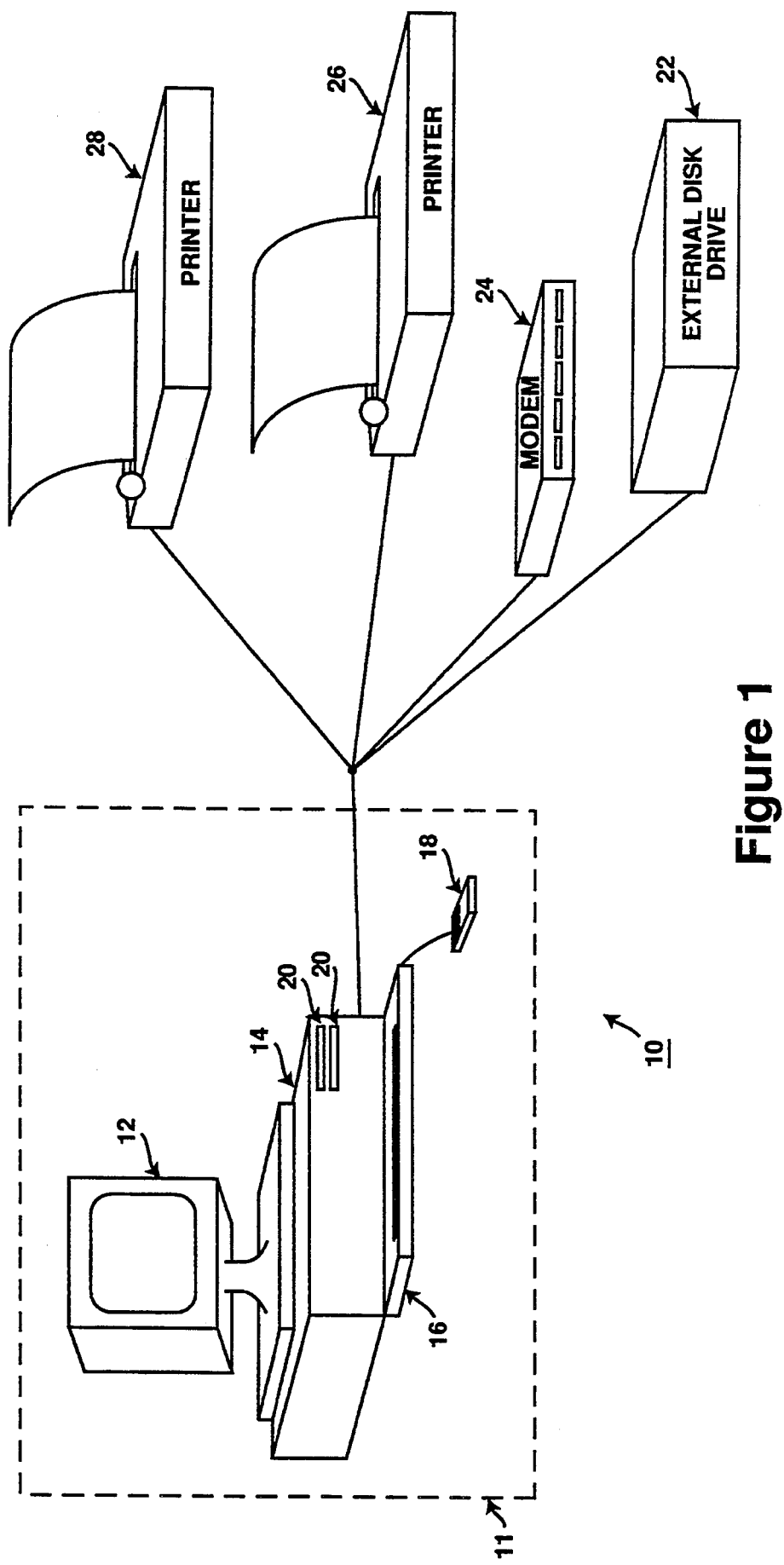
FIG. 1 illustrates a computer system.

FIG. 1 illustrates a computer system 10 in which the present invention operates. Computer system 10 includes a personal computer (PC) 11. PC 11 visually displays information to a computer user via monitor 12. PC 11 includes a central processing unit and internal memory (not shown), enclosed by housing 14. Keyboard 16 allows a computer user to provide input to the central processing unit. By moving mouse 18 a computer user may move a pointer on monitor 12. PC 11 also includes a disk drive 20, which reads software stored on floppy disks.

PC 11 includes a slot for coupling to a variety of devices, thus permitting expansion of computer system 10. For example, external disk drive 22, modem 24, printers 26 and 28 are all coupled to PC 11 through its slot. Each device coupled to PC 11 through the slot requests service using an interrupt request level (IRQ). As will be described in detail below, the present invention includes a method and circuitry for identifying free IRQs when coupling a new device to PC 11.

Table 1 of FIG. 2 lists the various IRQs provided to PC 11 and the devices typically assigned to those IRQs according to the type of processor within PC 11 and the number of bits in the slot. Common devices are assigned to a specific IRQ. For example, IRQ1 is typically assigned to keyboard 16, regardless of the type of processor included in PC 11 or the number of bits in its slot.

Figure 3:
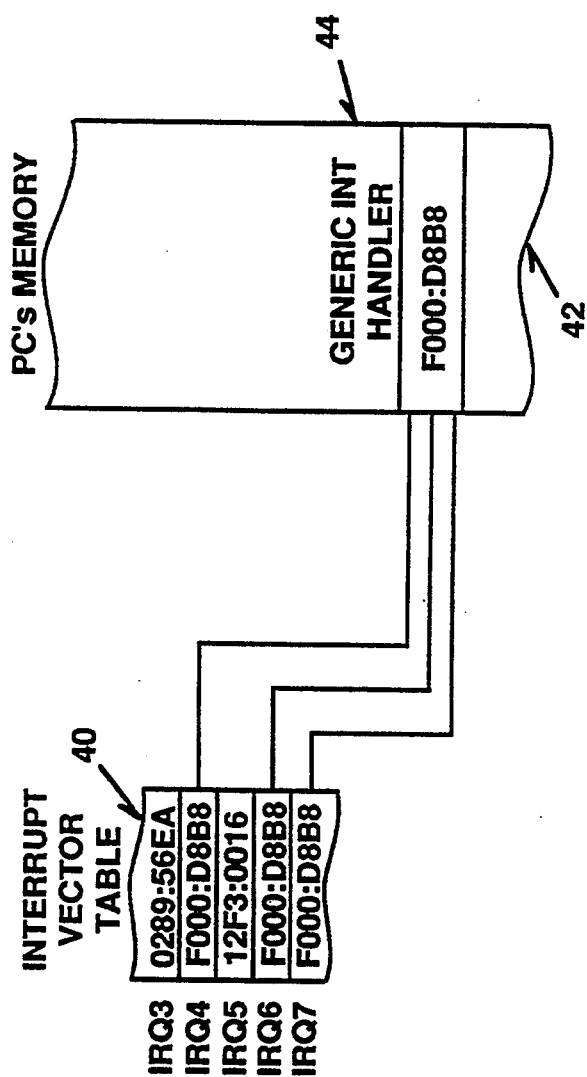
FIG. 3 is a diagram of an interrupt vector table and its relationship to a personal computer's memory.

PC 11 uses an interrupt vector table to respond to IRQs. FIG. 3 illustrates a portion of interrupt vector table 40. Interrupt vector table 40 stores a pointer for each IRQ. Each pointer points to a starting location of code within the PC's memory 42 for handling a specific interrupt request. Interrupt vector table 40 even includes a pointer for IRQs that are not currently assigned to a device. For these IRQs, interrupt vector table points to a generic interrupt handler 44, which handles spurious interrupt requests.

A programmable interrupt controller (PIC) within PC 11 monitors IRQs on bus 32, which couples devices 22, 24, 26, and 28 to the slot. The programmable interrupt controller (PIC) uses a PIC mask to perform its function. The PIC mask dynamically indicates whether an IRQ is turned on or off.

Figure 4:
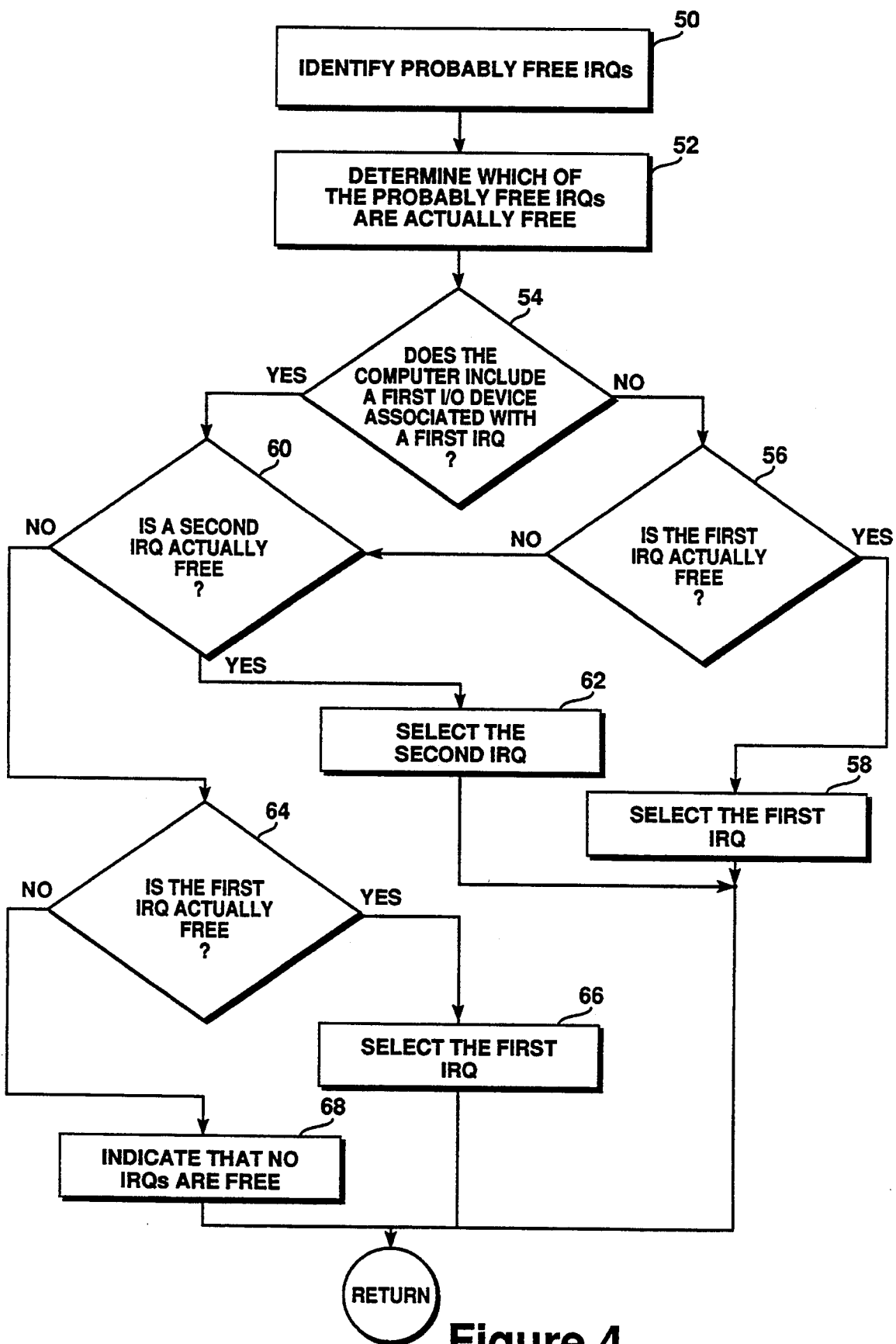
FIG. 4 is a flow diagram of a method of selecting a free IRQ from a multiplicity of existing IRQs.
Figure 5A:
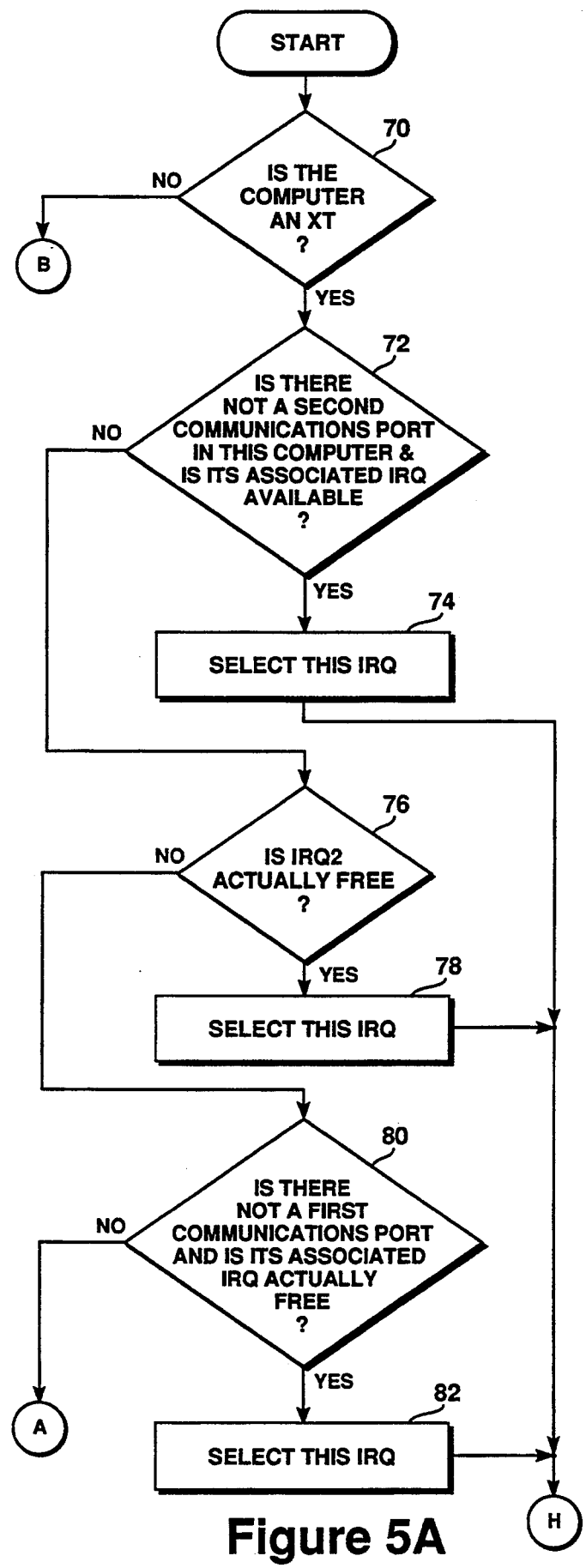
FIG. 5A illustrates steps 70–82 of a method of selecting the IRQ least likely to be assigned in the future from among the actually free IRQs.
Figure 5B:
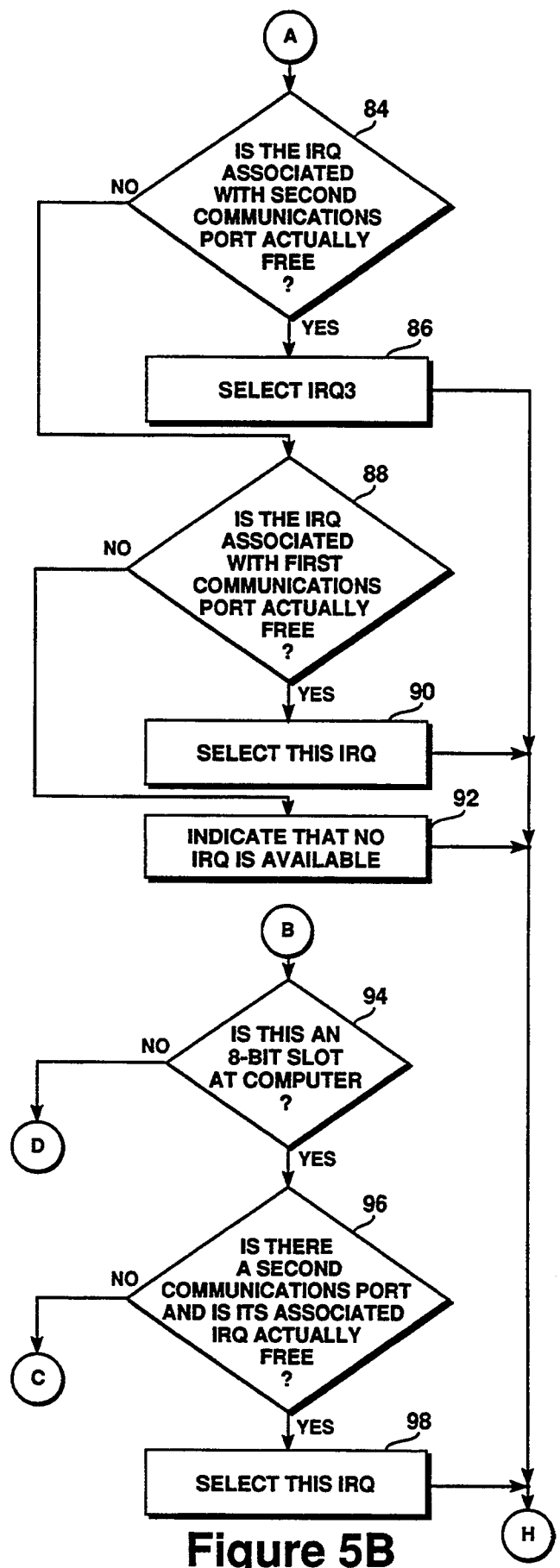
FIG. 5B illustrates steps 84–98 of the method of selecting the IRQ least likely to be assigned in the future form among the actually free IRQs.
Figure 5C:
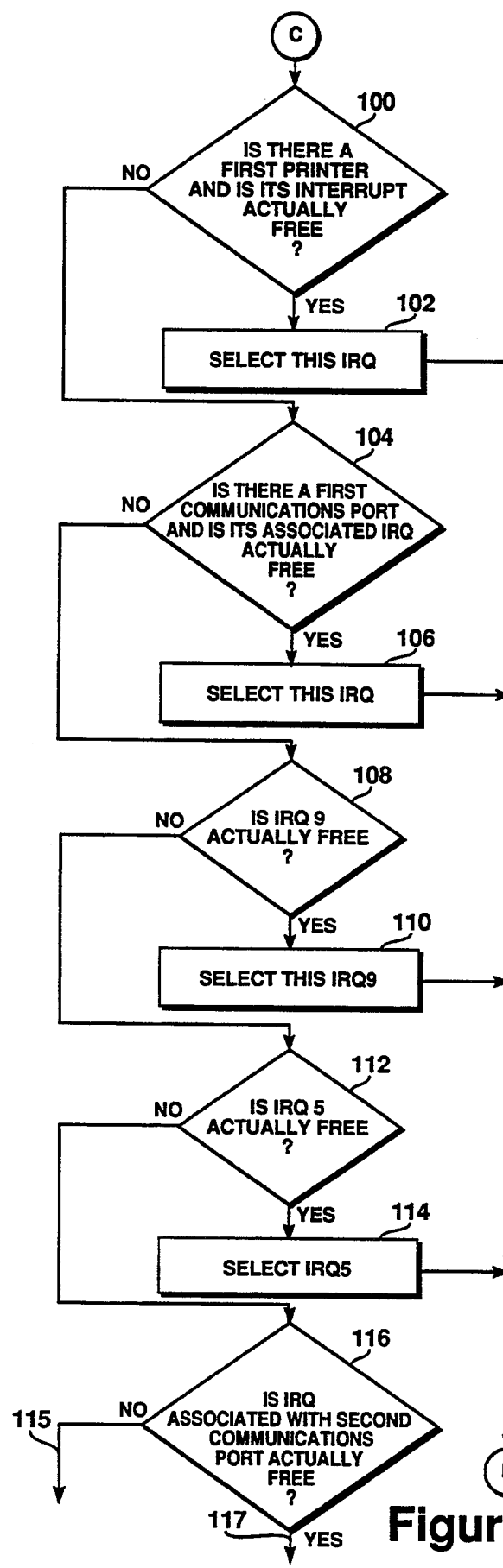
FIG. 5C illustrates steps 100–116 of the method of selecting the IRQ least likely to be assigned in the future from among the actually free IRQs.
Figure 5D:
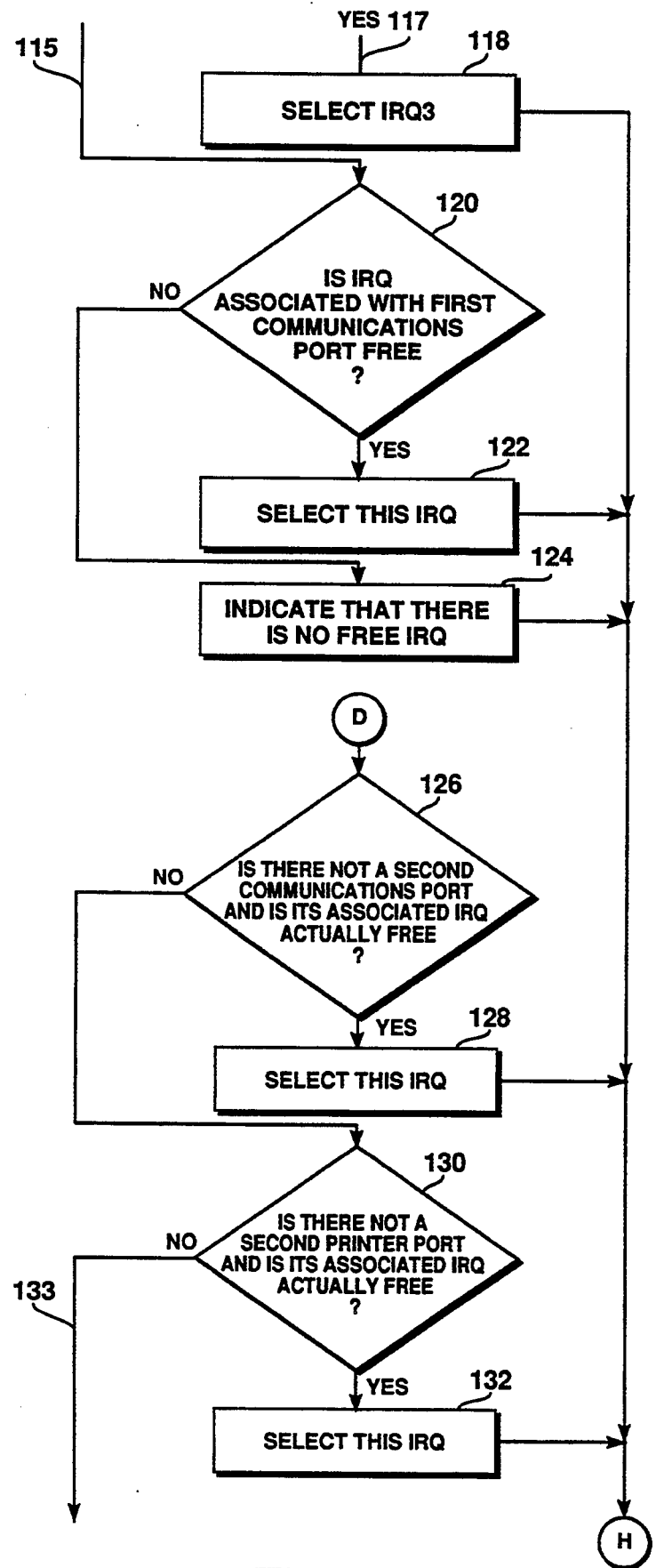
FIG. 5D illustrates steps 118–132 of the method of selecting the IRQ least likely to be assigned in the future form among the actually free IRQs.
Figure 5E:
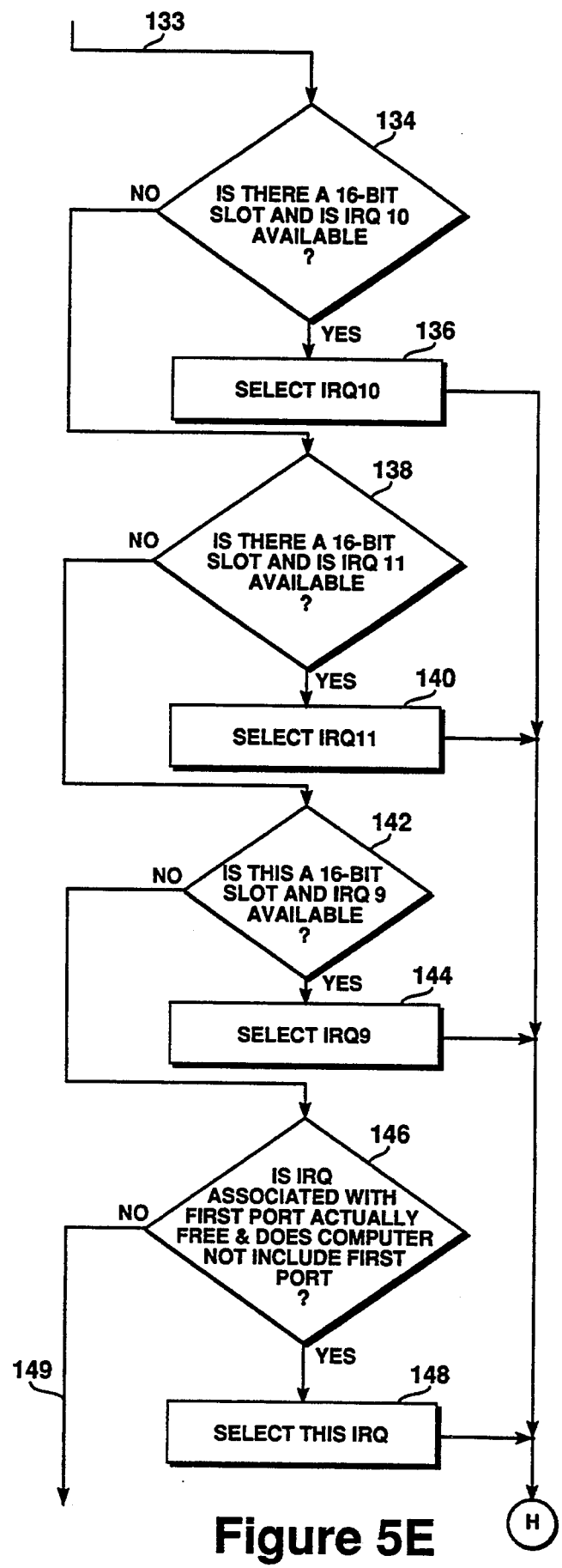
FIG. 5E illustrates steps 134–148 of the method of selecting the IRQ least likely to be assigned in the future from among the actually free IRQs.
Figure 5F:
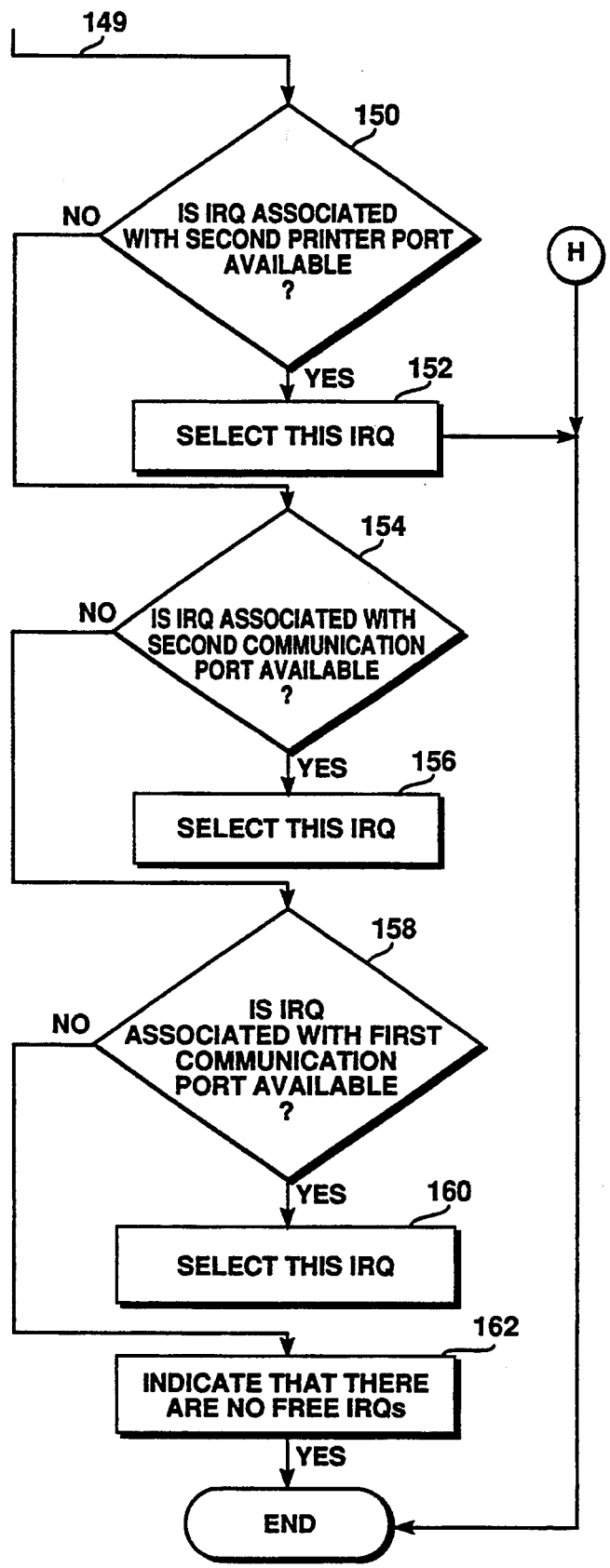
FIG. 5F illustrates steps 150–162 of the method of selecting the IRQ least likely to be assigned in the future from among the actually free IRQs.

FIG. 4 is a flow diagram of a method of selecting an IRQ in conjunction interrupt vector table 40 and the PIC mask. When embodied in software and stored in the memory of PC 11 or the memory of a PC add-in board, such as a network interface card, the method of the present invention enables identification and selection of a free IRQ.

Selection of an IRQ, so that an IRQ maybe assigned to a device being added to computer system 10 begins in step 50 by identifying probably free IRQs. Probably free IRQs for assignment to a new device are identified by examining the pointers of interrupt vector table 40. When three or more IRQs point to the same interrupt handler, they are identified as probably free. For example, in FIG. 3 IRQs 4, 6, and 7 are probably free because they all point to the same location in PC memory 42.

Automatic selection of an IRQ continues in step 52. There, it is determined which of the probably free IRQs for assignment to a new device are actually free. This determination is made by reading the PIC mask. An IRQ is identified as actually free if it is turned off at the PIC mask and has been identified as probably free.

The goal of the remaining steps is to select an actually free IRQ from among the free IRQs that is most likely to remain free in the future. Stated conversely, PC 11 attempts in steps 54–68 to select the actually free IRQ that is least likely to be assigned in the future as compared to other actually free IRQs. The actually free IRQs typically considered for selection first are those IRQs assigned to an input/output (I/O) device by Table 1 provided that the I/O device is not coupled to PC 11. Whether or not computer system 10 includes a particular I/O device can be determined by reading the basic input/output system (BIOS) of PC 11 at the appropriate address. If the existence of the I/O device is detected, assignment of its associated IRQ will be avoided in favor of assignment of another actually free IRQ. The IRQs considered next as least likely to be assigned are those IRQs that are not assigned to any particular I/O device. If no such IRQ is actually free, then an IRQ typically assigned to a typically device will be selected if it is actually free, even though computer system 10 includes that type of I/O device. During the selection process IRQs that typically are assigned to basic I/O devices, such as keyboard 16 or a disk drive, are not considered as candidates for assignment.

With step 54, the process of choosing among the actually free IRQs begins. For simplicity's sake, steps 54–68 illustrate the process of selecting an IRQ from among two existing IRQs, one of which is associated with an I/O device and one which is not.

The first step in selecting the IRQ least likely to be needed, or assigned, is to determine whether computer system 10 includes a first I/O device typically associated with a first IRQ. If the first I/O device is not included in computer system 10 then the first IRQ is not likely to be assigned to another device. In this case, examination of IRQs continues by branching from step 54 to step 56.

In step 56 it is determined whether the first IRQ typically associated with the first I/O device is actually free. The first IRQ is selected for assignment to the device being added to the computer system 10 in step 58 if the first IRQ is actually free.

The second IRQ is examined in step 60, either because the first I/O device is part of computer system 10 or because the first IRQ is not actually free. The second IRQ is selected for assignment to the device being added to the computer system 10 in step 62 if the second IRQ is actually free.

Selection of the first IRQ must be considered in step 64 even if computer system 10 includes the first I/O device. If the first IRQ is actually free it is selected for assignment in step 60. On the other hand, if the first IRQ is not actually free, then there is no free IRQ that can be assigned to the new device. This is indicated in step 68.

FIG. 5 illustrates in detail a method of selecting an IRQ after identifying actually free IRQs. According to FIG. 5 an IRQ may be selected for assignment to a new device for an XT PC, an AT PC with an 8 bit slot, or an AT PC with a 16 bit slot.

To begin the discussion of FIG. 5 assume that PC 11 is an XT computer. Selection of an IRQ when personal computer 11 an XT takes place in steps 70–92.

Selection of a free IRQ for an XT begins in step 72 by determining two things. First, is a second communications port not included in PC 11 ? Second, is the IRQ typically associated with the second communications port, IRQ3, actually free ? If the answers to both of these questions is yes then IRQ3 is selected for assignment to the new device is step 74. On the other hand, if the answer to either question is no then the search for an IRQ continues by branching to step 76.

In step 76 it is determined if the only IRQ not typically assigned to an I/O device in an XT, IRQ2, is actually free. IRQ2 is selected in step 78 if IRQ2 is actually free. Otherwise, selection continues by branching to step 80.

In step 80 the suitability of IRQ4, which is typically associated with the first communications port, is determined. For IRQ4 to be suitable for assignment for the new device PC 11 must not include the first communications port and IRQ4 must be actually free. If both conditions are met, IRQ4 is selected in step 82. If both conditions are not met, selection of an IRQ continues by branching to step 84.

In step 84 it is determined whether IRQ3 is actually free. If so, it is selected in step 86 even though PC 11 includes the second communications port with which IRQ3 is normally associated. If IRQ3 is not actually free, the search continues by branching to step 88.

The IRQ normally associated with the first communications port is examined in step 88. If actually free, IRQ4 is selected in step 90. If IRQ4 is not actually free then there are no free IRQs in the XT that can be assigned to the device. This is indicated in step 92.

If PC 11 is not an XT, selection of an IRQ for assignment to the new device begins by branching from step 70 to step 94. PC 11 must be an AT computer, thus in step 94 it is determined whether the slot is an 8 bit slot or 16 bit slot. Let us assume that PC 11 includes an 8 bit slot. As a result, selection of an IRQ begins in earnest with step 96.

In steps 96 and 98, the IRQ, normally associated with a second communications port is examined and selected in the same manner discussed with respect to steps 72 and 74. Also, as discussed previously, if IRQ3 is not actually free or PC 11 includes the second communications port, then another IRQ is examined.

In step 100 the suitability of IRQ7 is determined. As IRQ7 is normally associated with printer 1, selection of IRQ7 takes place provided computer system 10 does not include printer 1 and IRQ7 is actually free. When these conditions are satisfied, IRQ7 is selected in step 102 as the IRQ least likely to be assigned in the future. If these conditions are not met, the search for a free IRQ continues by branching to step 104.

The IRQ normally associated With first communications port, IRQ4, is examined in step 104. If the conditions discussed with respect to step 88 are met, IRQ4 is selected for assignment to the new device in step 106. Otherwise, the selection process continues in step 108.

IRQ9 is examined in step 108. IRQ9 is selected in step 110 if it is actually free. If IRQ9 is not actually free, then IRQ5 is examined in step 112 to see if it is actually free. IRQ5 is selected for assignment to the new device in step 114 if IRQ5 is actually free. Otherwise, the search proceeds with step 116.

In step 116 it is determined whether IRQ3, normally associated with the second communications port is actually free. If so, IRQ3 is selected in step 118 even though PC 11 includes the second communications port.

The IRQ normally associated with the first communications port, IRQ4, is examined in step 120 if IRQ3 was not actually free. IRQ4 is selected in step 122 if it is actually even though PC 11 includes the first communications port. If IRQ4 is not actually free, then there are no free IRQs in the AT with an 8 bit slot. This is indicated to the computer user in step 124.

Selection of a free IRQ for assignment to a device added to a computer system 10, which includes an AT computer with a 16 bit slot begins in earnest in step 126. As with the XT, selection begins by determining the suitability of the IRQ normally associated with the second communications port, IRQ3. IRQ3 is indicated as the IRQ selected to be assigned to the new device in step 128 if the conditions discussed with respect to step 72 are met. If those conditions are not met, the selection process continues by advancing to step 130.

The IRQ normally associated with printer 2 is considered in step 130. That IRQ, IRQ5, is desirable provided that computer system 10 does not include printer 2 and IRQ5 is actually free. If these conditions are met IRQ 5 is selected as the IRQ to be assigned to the new device in step 132.

Examination of IRQs peculiar to the 16 bit slot AT begins in step 134. Three IRQs are examined: IRQ10, IRQ11 and IRQ9. The decision process is the same for all three. To be selected PC 11 must include a 16 bit slot, as indicated by the assertion of a variable called "slot type," and the IRQ must be actually free. Selection of a free IRQ continues in step 146 if these conditions are not satisfied for IRQ10, IRQ11, or IRQ9.

The IRQ typically associated with the first communications port is examined in step 146. IRQ4 is selected for assignment in step 148 provided that it is determined in step 146 that PC 11 does not include a first communications port and IRQ4 is actually free. Otherwise the selection process continues with step 150.

Entry into step 150 means that an IRQ normally associated with a device will be selected even though computer system 10 includes the IRQ's associated device. The IRQ normally associated with printer 2 is considered first. If that IRQ, IRQ5, is actually free it is selected for assignment to the new device in step 152. The IRQ normally associated with the second communications port, IRQ3, is considered when IRQ5 is not free. IRQ3 is selected in step 154 if it is actually free even though PC 11 includes the second communications port. If IRQ3 is not selected then IRQ4 is examined. IRQ4 will be selected in step 160 if it is actually free even if PC 11 includes the first communications port. If IRQ4 is not actually free, then it is indicated to the computer user in step 162 that there are no free IRQs.

Thus, a three-step method for selecting a free IRQ for assignment to a device being added to a computer system has been described. The first step is identification of probably free IRQs by reading an interrupt vector table. The second step is reading a PIC mask to determine if probably free IRQs are actually free. Third, and finally, an IRQ is selected for assignment from the actually free IRQs that is least likely to be needed in the future.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. In a computer system having a multiplicity of IRQs, a method of selecting for assignment to a device to be added to the computer system a free interrupt request level (IRQ) from the multiplicity of IRQs, the method comprising the steps of:
   a) providing an interrupt vector table having a pointer to an interrupt handler for each of the multiplicity of IRQs:
   b) identifying a first set of probably free IRQs from the multiplicity of IRQs by
      i) examining each pointer in the interrupt vector table to determine if a minimum number of pointers point to a same interrupt handler and
      ii) identifying IRQs having pointers pointing to the same interrupt handler as the first set of probably free IRQs;
   c) identifying a second set of actually free IRQs from the first set of probably free IRQs; and
   d) automatically selecting for assignment to the device a one of the actually free IRQs that is least likely to be assigned.

2. The method of claim 1 wherein step d) comprises:
   a) automatically selecting for assignment to the device a first IRQ typically assigned to a first I/O device if the computer system does not include the first I/O device and the first IRQ is a member of the second set of actually free IRQs.

3. The method of claim 2 wherein the selecting for assignment step further comprises:
   a) automatically selecting for assignment to the device a second IRQ typically assigned to a second device that is not an I/O device if the second IRQ is a member of the second set of IRQs and if the first IRQ is not a member of the second set or if the computer system includes the first I/O device.

4. The method of claim 3 wherein the selecting for assignment step further comprises:
   a) automatically selecting for assignment the device the first IRQ if the first IRQ is a member of the second set of actually free IRQs and the second IRQ is not a member of the second set of actually free IRQs.

5. The method of claim 1 wherein the minimum number of pointers is 3.

6. A method of selecting for assignment to a device a free interrupt request level (IRQ) in a computer system having a personal computer having a processor and a slot, the method comprising the steps of:
   a) determining whether the processor is a first type processor or a second type processor, the first type of processor having a first multiplicity of IRQs;
   b) determining whether the slot is a first type of slot or second type of slot if the processor is the second type of processor, the first type of slot having a second multiplicity of IRQs and the second type of slot having a third multiplicity of IRQs;

c) identifying a first set of probably free IRQs from the first multiplicity of IRQs, the second multiplicity of IRQs, and the third multiplicity of IRQs;

d) identifying a second set of actually free IRQs from the first set of probably free IRQs;

e) if the processor is the first type of processor automatically selecting for assignment to the device a one of the actually free IRQs within the first multiplicity of IRQs that is least likely to be assigned;

f) if the processor is the second type processor;
   1) if the slot is the first type of slot automatically selecting for assignment to the device a one of the actually free IRQs within the second multiplicity of IRQs that is least likely to be assigned; and
   2) if the slot is the second type of slot automatically selecting for assignment to the device a one of the actually free IRQs within the third multiplicity of IRQs that is least likely to be assigned.

7. The method of claim 6 wherein the personal computer includes an interrupt vector table having a pointer to an interrupt handler for each IRQ associated with the processor and the slot and wherein the step of identifying the first set of probably free IRQs comprises the steps of:

a) examining each pointer in the interrupt vector table to determine if a minimum number of pointers point to a same interrupt handler;

b) identifying IRQs having pointers pointing to the same interrupt handler as the first set of probably free IRQs.

8. The method of claim 7 wherein the minimum number of pointers is 3.

9. The method of claim 7 wherein the personal computer is coupled to a programmable interrupt controller (PIC) having a PIC mask, the PIC mask indicating IRQs associated with the processor and slot that are turned on and IRQs associated with the processor and the slot that are turned off, and wherein the step of identifying the second set of actually free IRQs comprises the steps of:

a) identifying as an actually free IRQ any IRQ that the PIC mask indicates is turned off.

10. The method of claim 6 wherein step e) comprises the steps of:

a) automatically selecting for assignment to the device a first IRQ normally associated with a first I/O device if the computer system does not include the first I/O device and the first IRQ is a member of the second set of actually free IRQs;

b) automatically selecting for assignment to the device a second IRQ normally assigned to a second device which is not an I/O device if the second IRQ is a member of the second set or the computer system includes the first I/O device; and c) automatically selecting for assignment to the device the first IRQ if the first IRQ is a member of the second set of actually free IRQs and the second IRQ is not a member of the second set of actually free IRQs.

11. The method of claim 68 wherein step f1) comprises the steps of:

a) automatically selecting for assignment to the device a third IRQ normally associated with a third device, the third device being an I/O device, if the computer system does not include the third, device and the IRQ is a member of the second set of actually free IRQs;

b) automatically selecting for assignment to the device a fourth IRQ normally associated with a fourth device that is not an I/O device if the fourth IRQ is a member of the second set of actually free IRQs and if the third IRQ is not a member of the second set of actually free IRQs or the computer system includes the third device; and c) automatically selecting for assignment to the device the third IRQ if the third IRQ is a member of the second set of actually free IRQs and the fourth IRQ is not a member of the second set of actually free IRQs.

12. The method of claim 6 wherein step f2) comprises the steps of:

a) automatically selecting assignment to the device a fifth IRQ associated with a fifth device that is not an I/O device if the personal computer does not include the fifth device and the fifth IRQ is a member of the second set of actually free IRQs;

b) automatically selecting for assignment to the device a sixth IRQ typically assigned to a sixth device that is not an I/O device if the sixth IRQ is a member of the second set of actually free IRQs or the computer system includes the fifth device; and c) automatically selecting for assignment to the device the fifth IRQ is the fifth IRQ is a member of the second set of actually free IRQs and the sixth IRFQ is not a member of the second set of actually free IRQs.

13. Circuitry for selecting for assignment to a device a free IRQ within a computer system having a multiplicity of IRQs, the computer system including a programmable interrupt controller for handling interrupt requests according to associated IRQs, the circuitry comprising:

a) an interrupt vector table having a pointer to an interrupt handler for each of the multiplicity of IRQs;

b) first means for identifying a first set probably free IRQs from the multiplicity of IRQs, the first means for identifying being coupled to the programmable interrupt controller and the interrupt vector table, the first means including:
   i) second means for examining each pointer in the interrupt vector table to determine if a minimum number of pointers point to a same interrupt handler; and
   ii) third means for identifying IRQs having pointers pointing to the same interrupt handler as the first set of probably free IRQs;

c) fourth means for identifying a second set of actually free IRQs from the first set of probably free IRQs, the fourth means being coupled to the first means and the programmable interrupt controller; and d) fifth means for automatically selecting for assignment to the device a first IRQ a one of the actually free IRQs that is least likely to be assigned, the fifth means being coupled to the fourth means.

14. In a computer system having a multiplicity of IRQs, a method of selecting for assignment to a device to be added to the computer system a free interrupt request level (IRQ) from the multiplicity of IRQs, the method comprising the steps of:

a) providing a programmable interrupt controller (PIC) having a PIC mask, the PIC mask indicating which of the multiplicity of IRQs are turned on and which of the multiplicity of IRQs are turned off;

b) identifying a first set of probably free IRQs from the multiplicity of IRQs;

c) identifying a second set of actually free IRQs from the first set of probably free IRQs by identifying as an actually free IRQ any probably free IRQ that the PIC mask indicates is turned off; and d) automatically selecting for assignment to the device a one of the actually free IRQs that is least likely to be assigned.

* * * * *

UNITED STATES PATENT AND TRADEMARK OFFICE
CERTIFICATE OF CORRECTION

PATENT NO. : 5,369,769
DATED : November 29, 1994
INVENTOR(S) : Phil Martin, et al.

It is certified that error appears in the above-indentified patent and that said Letters Patent is hereby corrected as shown below:

On the title page [57] Abstract, Delete "Circuitry for selecting a free IRQ within a computer system having a multiplicity of IRQs is also described. The circuitry includes circuitry for identifying a first set of probably free IRQs from the multiplicity of IRQs, circuitry for identifying a second set of actually free IRQs from the first set of probably free IRQs, and circuitry for selecting as the free IRQ a first IRQ a one of the actually free IRQs that is least likely to be requested."

Signed and Sealed this

Twentieth Day of June, 1995

*Attest:*

BRUCE LEHMAN

*Attesting Officer*     *Commissioner of Patents and Trademarks*